(12) United States Patent
Agranat

(10) Patent No.: US 8,627,723 B2
(45) Date of Patent: Jan. 14, 2014

(54) DIGITAL SAMPLING AND ZERO CROSSING OF ACOUSTIC SIGNALS OF ANIMALS

(75) Inventor: Ian Agranat, Concord, MA (US)

(73) Assignee: Wildlife Acoustics, Inc., Concord, MA (US)

( * ) Notice: Subject to any disclaimer, the term of this patent is extended or adjusted under 35 U.S.C. 154(b) by 299 days.

(21) Appl. No.: 13/206,983

(22) Filed: Aug. 10, 2011

(65) Prior Publication Data

US 2013/0036823 A1    Feb. 14, 2013

(51) Int. Cl.
*G01H 5/00*    (2006.01)
(52) U.S. Cl.
USPC ............................................. 73/597; 73/645
(58) Field of Classification Search
USPC ........................................... 73/597, 645–648
See application file for complete search history.

(56) References Cited

U.S. PATENT DOCUMENTS

| 4,640,134 | A | | 2/1987 | Simmons |
| 4,761,725 | A | * | 8/1988 | Henze ............................. 363/46 |
| 4,949,580 | A | * | 8/1990 | Graham et al. ................. 73/646 |
| 5,623,220 | A | * | 4/1997 | Betti et al. ....................... 327/79 |
| 6,233,107 | B1 | * | 5/2001 | Minuhin .......................... 360/51 |
| 6,396,251 | B2 | * | 5/2002 | Corva et al. .................... 323/283 |
| 7,872,574 | B2 | * | 1/2011 | Betts et al. .............. 340/539.26 |
| 8,390,445 | B2 | * | 3/2013 | Betts et al. .............. 340/539.26 |
| 2011/0082574 | A1 | | 4/2011 | Pachet et al. |

FOREIGN PATENT DOCUMENTS

EP    0116777 A2    8/1984

* cited by examiner

*Primary Examiner* — J. M. Saint Surin
(74) *Attorney, Agent, or Firm* — Lando & Anastasi, LLP

(57) ABSTRACT

A method and apparatus for measuring frequency and amplitude of an input signal representative of an echolocation call. In one example, a system includes a combination of a digital sampling channel and a zero crossing measurement channel that are configured to simultaneously measure the echolocation call and produce a combined, time-synchronous data set representative of the echolocation call.

13 Claims, 3 Drawing Sheets

DIGITAL SAMPLING AND ZERO CROSSING OF ACOUSTIC SIGNALS OF ANIMALS

BACKGROUND

The ultrasonic echolocation calls produced by bats contain changing frequency and amplitude information through time. The accurate measurement of this information is desirable for automated species identification and other applications. Conventionally, two well known techniques for analyzing echolocation calls, each with their own limitations, are used.

One technique for analyzing echolocation calls includes digitally sampling the ultrasonic signals using an analog-to-digital converter, and then using a series of Fourier transforms to measure the power distribution through discrete frequency bins changing through time. This technique is known as full spectrum analysis. The Fourier transformation takes as input a sequence of N input samples at a sample rate R to produce N/2 evenly spaced frequency bins between 0 and R/2. For a larger value of N, the frequency resolution can be improved by dividing the power spectrum into a larger number of frequency bins, but at the cost of temporal resolution because more samples are required. Conversely, the temporal resolution can be improved by using a smaller value of N, but at the cost of frequency resolution because fewer frequency bins are used.

The second technique for analyzing echolocation calls is to use a comparator to convert the ultrasonic signal into a square wave with each transition representing a zero crossing from either negative to positive or positive to negative. A high frequency digital counter can be used to measure the zero crossing periods with high precision. Because most echolocation calls are narrowband frequency modulated signals, the zero crossing technique can accurately measure the change of frequency through time. However, all amplitude information is lost and thus the power spectrum cannot be determined by the zero crossing technique.

SUMMARY OF THE INVENTION

Aspects and embodiments are directed to methods and apparatus that combine both zero crossing and digital sampling techniques to simultaneously analyze the same echolocation calls. The zero crossing technique yields precise frequency information over time while the digital sampling yields precise amplitude information over time. The zero crossing and digital sampled data can both be input to signal processing algorithms for real-time analysis or stored to digital media for subsequent analysis, as discussed further below. By combining the two measurements as a single, time-synchronous data set, a more complex, and hence more useful, signature of an echolocation call is available, which can be used to discriminate between closely related echolocation calls of different species or sub-species of animal producing such calls.

According to one embodiment, a method for measuring frequency and amplitude of an input signal comprises receiving an input signal at an input of a comparator and at an input of an analog-to-digital converter, the comparator and the analog-to-digital converter being contained within a common housing, comparing a voltage of the input signal with a reference voltage using the comparator to produce a first output signal representing zero crossings of the input signal, and digitizing the input signal using the analog-to-digital converter to produce a second output signal representing the amplitude of the input signal.

In one example, the method further comprises filtering and amplifying the input signal prior to receiving the input signal at the input of the comparator. In another example, the method further comprises filtering and amplifying the input signal prior to receiving the input signal at the input of the analog-to-digital converter. Receiving the input signal may include receiving a signal representative of a sound wave, for example. In one example, the first output signal is a square wave, and the method further comprises measuring periods of the square wave to determine elapsed time between each consecutive zero crossing of the input signal. In another example, the first output signal is a square wave, and the method further comprises dividing the first output signal using a digital divider to aggregate periods of the square wave, and measuring the aggregated periods of the square wave to determine elapsed time between aggregated consecutive zero crossings of the input signal.

According to another embodiment, an echolocation call analysis system comprises an acoustic sensor configured to receive the echolocation call and to produce an input signal representative of the echolocation call, a comparator configured to receive the input signal and a reference signal, and to produce a first output signal based on a comparison of the input signal with the reference signal, the first output signal representing zero crossings of the input signal, and an analog-to-digital converter configured to receive the input signal and to produce a digitized second output signal representing the amplitude of the input signal.

In one example of the echolocation call analysis system the first output signal is a square wave and the system further comprises a digital counter configured to measure periods of the square wave to determine elapsed time between each consecutive zero crossing of the input signal. In another example the first output signal is a square wave, and the system further comprises a digital divider configured to receive the first output signal and to aggregate periods of the square wave, and a digital counter coupled to the digital divider and configured to measure the aggregated periods of the square wave to determine elapsed time between aggregated consecutive zero crossings of the input signal. In another example, the system further comprises a power supply coupled to the analog-to-digital converter and to the comparator, and a controller coupled to the power supply and configured to control the power supply to selectively operate at least one of the comparator and the analog-to-digital converter. The controller may be configured to activate the analog-to-digital converter responsive to a determination that the echolocation call corresponds to an animal of interest. In another example, the controller includes a user interface configured to receive a user input, and is configured to control the power supply to selectively operate at least one of the comparator and the analog-to-digital converter responsive to the user input. The controller may further be configured to activate the analog-to-digital converter to obtain a background measurement from the acoustic sensor, and to adjust the reference signal responsive to the background measurement. The echolocation call analysis system may further comprise a digital processor coupled to the comparator and to the analog-to-digital converter and configured to receive the first and second output signals. In another example, the system further comprises a housing, wherein the analog-to-digital converter and the comparator are disposed within the housing.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. For purposes of clarity, not every component may be labeled in every figure. In the figures.

DETAILED DESCRIPTION

Aspects and embodiments are directed to methods and apparatus for analyzing echolocation calls using a combination of both zero crossing and digital sampling (full spectrum analysis) techniques within the same device. By combining both measurement techniques, embodiments of the echolocation call analysis system and method may enjoy a synergy that produces a more complex and detailed signature of each echolocation call and thus may allow for more accurate identification of animal producing the call. In addition, as discussed further below, the device may be configurable to allow a user to select different modes of operation to conserve power and/or to assist the user in analyzing the echolocation calls.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
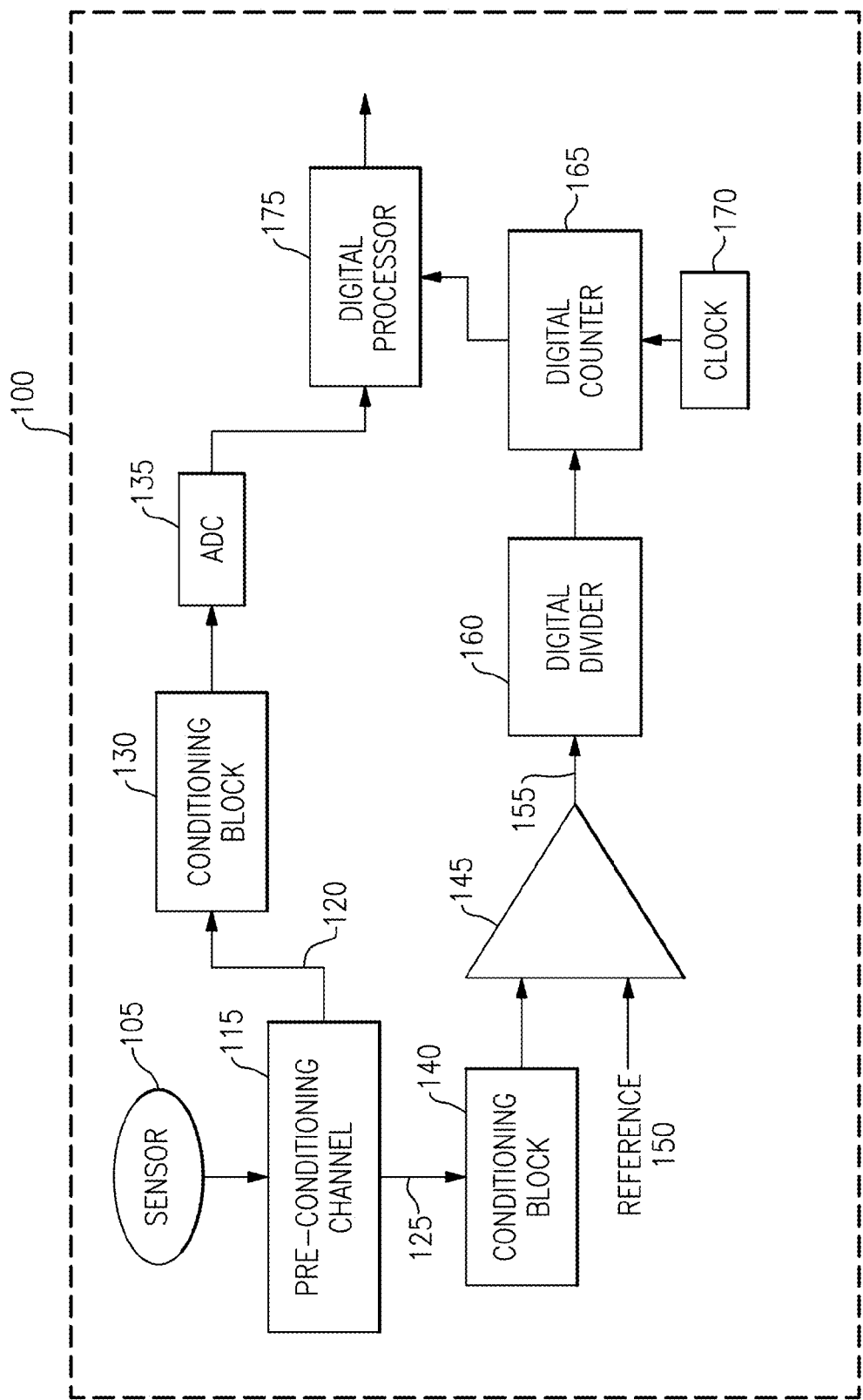
FIG. 1 is a block diagram of one example of an echolocation recording and/or analysis system according to aspects of the invention.
Figure 2A:
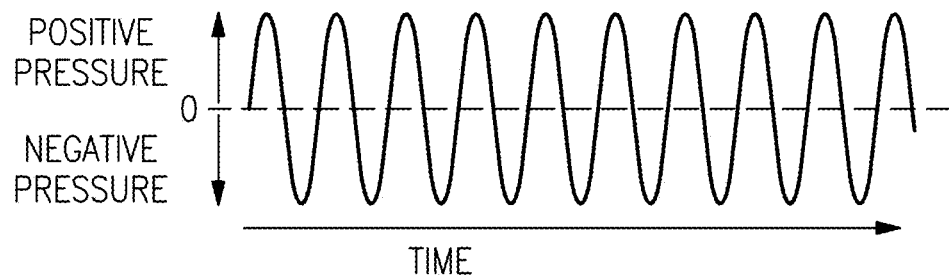
FIG. 2A is a diagram of one example of an echolocation call.
Figure 2B:
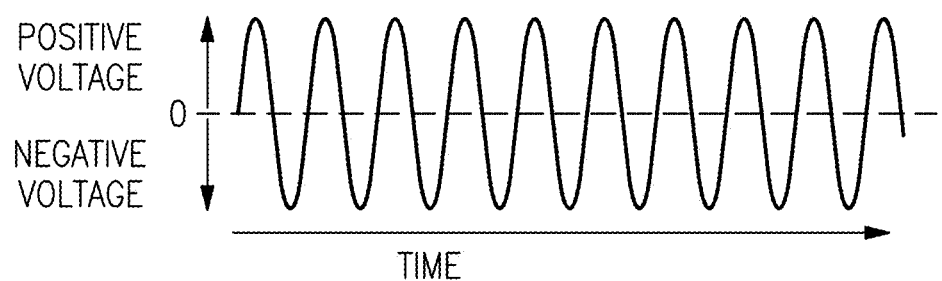
FIG. 2B is a diagram of an electrical signal corresponding to the echolocation call of FIG. 2A.

Referring to FIG. 1, there is illustrated a block diagram of one example of an echolocation recording and/or analysis system according to one embodiment. The system 100 includes an acoustic sensor 105 that receives an ultrasonic echolocation call from an animal, such as a bat, for example, and produces an electrical signal 110. FIGS. 2A and 2B illustrate an example of a sinusoidal pressure wave (FIG. 2A) that may be part of an ultrasonic echolocation call, and a corresponding electrical signal (FIG. 2B). In one example the acoustic sensor 105 includes a microphone. The electrical signal 110 may be preconditioned with analog amplifiers and filters 115. Amplification may be generally desired because most acoustic sensors have an output that is very weak, for example, on the order of micro-volts to milli-volts, and needs to be amplified (e.g., approximately 100 fold) to levels suitable for an analog-to-digital converter or for a zero-crossing comparator. Filtering is useful because most of the power spectrum of ambient background noise is in lower frequencies while echolocation calls of interest may be in higher frequencies. Accordingly, analog high-pass filtering to attenuate uninteresting and unwanted low frequency noise is desirable. This allows for higher amplification of input signals of interest without over saturating the amplifiers due to the higher energy present in lower frequencies. After preconditioning, the electrical signal 110 is then split into two signals 120 and 125, each of which is applied to a different analysis channel and analyzed using a different process, as discussed further below.

In an alternative embodiment, the ultrasonic echolocation call may be separately received by two, separate sensors (e.g., microphones) and preconditioned by two, separate preconditioning channels 115; each including analog amplifiers and filters, as may be desired, producing the two signals 120 and 125 identified above.

According to one embodiment, the first signal 120 is provided to a digital sampling channel for full spectrum analysis. The first signal 120 may be further conditioned by conditioning block 130, which may include analog amplifiers and filters. As discussed above, analog amplification and filtering may be generally desired to improve the input signal for analysis of echolocation calls of interest. In some examples, all desired amplification and/or filtering may be accomplished in the preconditioning channel 115. However, in other embodiments, additional amplification and/or filtering are performed using conditioning block 130 (and 140 discussed below). Implementing at least some amplification and/or filtering within the two separate analysis channels allows for optimization of the signal for the particular type of processing/analysis performed by the different channels. The first signal 120 is then digitized by an analog-to-digital converter 135 and the digital signal is provided to a digital processor 175. The digital processor 175 may be configured to perform a full spectrum analysis of the digitized first signal 120, as discussed above and in accord with well established techniques known to those skilled in the art.

Still referring to FIG. 1, the second signal 125 is provided to a zero crossing analysis channel. As discussed above, the second signal 125 may be further conditioned with analog amplifiers and filters in conditioning block 140. For zero crossing detectors, high-pass filtering may be particularly important for the detector to be able to detect crossings near the zero-line through high frequency signals. If high frequency signals are added to low frequency noise of greater amplitude, then the zero crossings will pick up only the low frequency noise and may be incapable of picking up the higher frequency components. Accordingly, the conditioning block 140 may include high-pass filtering, optionally in addition to any filtering that may be accomplished in the preconditioning channel 115.

Figure 2C:
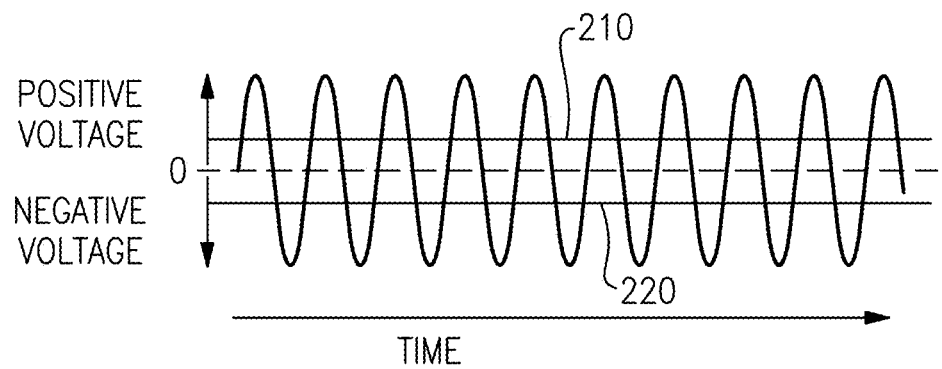
FIG. 2C is a diagram of the electrical signal corresponding to the echolocation call of FIG. 2A showing detector reference levels according to aspects of the invention.

After conditioning 140, the second signal 125 is input to a comparator 145. In one embodiment, the comparator 145 compares the signal voltage with a reference voltage 150 and produces a square wave output 155. When the signals of interest are not present or very weak, there may be a great amount of noise around the zero voltage line. Therefore, a zero crossing detector simply triggering at exact and literal zero ("0") crossings may trigger randomly and frequently due to background noise unless a strong enough signal is present that exceeds the ambient background noise levels. In the absence of a priori amplitude information about the signals of interest, it may be difficult to differentiate between a signal of interest and background noise as the source of zero crossings. Accordingly, the reference voltage 150 is used to move the trigger values for the comparator away from the zero voltage line. Thus, the trigger for the comparator 145 is no longer transitions from negative to positive or positive to negative (as illustrated in FIG. 2B), but rather, a threshold above and/or below the zero line is established, and zero crossing detections are made when the second signal 125 exceeds these thresholds. For example, referring to FIG. 2C, zero crossings may be detected when the second signal 125 rises above a first threshold 210 above zero volts or falls below a second threshold 220 below zero volts. In another example, rather than using two thresholds 210, 220, the comparator 145 may be configured with the reference voltage 150 set to a voltage level a little above or below the centerline 230 (zero volts), and therefore will trigger when the second signal 125 crosses this level.

Referring again to FIG. 1, the square wave output 155 from the comparator 145 represents the times at which zero crossings occur by the times at which the square wave transitions from a high state to a low state, or vice-versa. A digital counter 165 is clocked by a high speed clock 170. The square wave output 155 is also input to the digital counter and the counter is read by the digital processor 175 at each transition of the square wave. Thus, the digital counter 165 is used to measure the zero crossing periods (i.e., periods of the square wave output 155 and therefore elapsed time between each consecutive zero crossing) with high precision. As discussed above, this technique may obtain very accurate frequency information from the input signal 110. In the illustrated example, the digital counter 165 is separate from the digital processor 175; however, in other examples the digital counter may be integral with or part of the digital processor.

In one embodiment, as illustrated in FIG. 1, a digital divider 160 may be used to aggregate a number of consecutive zero crossings if a lower data rate is desirable. Thus, as illustrated in FIG. 1, the digital counter 165 is read at each transition output by the digital divider 160, rather directly from the square wave output 155. For example, the digital divider 160 may divide by N (N being an integer), thus allowing the digital counter 165 to count (and be read at) every N oscillations, or zero crossings, rather than each zero-crossing. The digital divider 160 may therefore reduce the data rate by a factor of N. In this example, the digital counter 165 may record the elapsed time between aggregated consecutive zero crossings, that is, between each N consecutive zero crossings. This may be beneficial, for example, if the echolocation call includes very high frequency components. The digital counter may be programmable to allow for user-controlled or automatic variation in the value of N. The output of the digital counter 165 is sequence of timings output for processing, for example, by the digital processor 175. Thus, in one embodiment, the digital processor 175 is used to analyze the output from the digital counter 165 and perform the zero crossing analysis of signal 125, in addition to performing the full spectrum processing of signal 120 discussed above. Alternatively, dedicated processors (not shown) may be used for each analysis channel.

Thus, embodiments of the echolocation recording and/or analysis system 100 may provide simultaneous processing of echolocation calls using both the digital sampling (or full spectrum) techniques and the zero crossing approach. As a result, aspects of various embodiments enjoy a synergy that permits better discrimination of closely-related echolocation calls. The synergistic result produces a more detailed signature of each echolocation call. For example, the two processing channels each may be optimized to extract complimentary information from the signals 120 and 125, respectively, with high precision and accuracy, such that the combination of the information from each channel may yield a more complex, and hence more useful, signature of an echolocation call. This signature may be used to discriminate between closely related echolocation calls of different species or subspecies of animal producing such calls.

Operating two conventional systems (e.g., a full spectrum analysis system and a zero-crossing system) side-by-side cannot produce the desired synergy because it is difficult to synchronize two disparate systems and to integrate the data from these systems in real time or after overnight recording operations. This is in part due to the fact that such separate instruments have separate clocks that are difficult to synchronize and maintain in synchronous operation. As a result, the two conventional techniques have acquired separate and distinct followings in the art, with competing advocates for each of the techniques for measuring echolocation calls. In contrast, aspects and embodiments leverage the recognition that zero crossing and full spectrum analyses provide information that can be complementary such that the two measurement techniques can be synergistically combined in a single instrument. By combining the two measurements as a single, time-synchronous data set, a more complex representation of the echolocation call is available, which can be analyzed to more accurately, or with more certainty, identify the animal generating the call.

Figure 3:
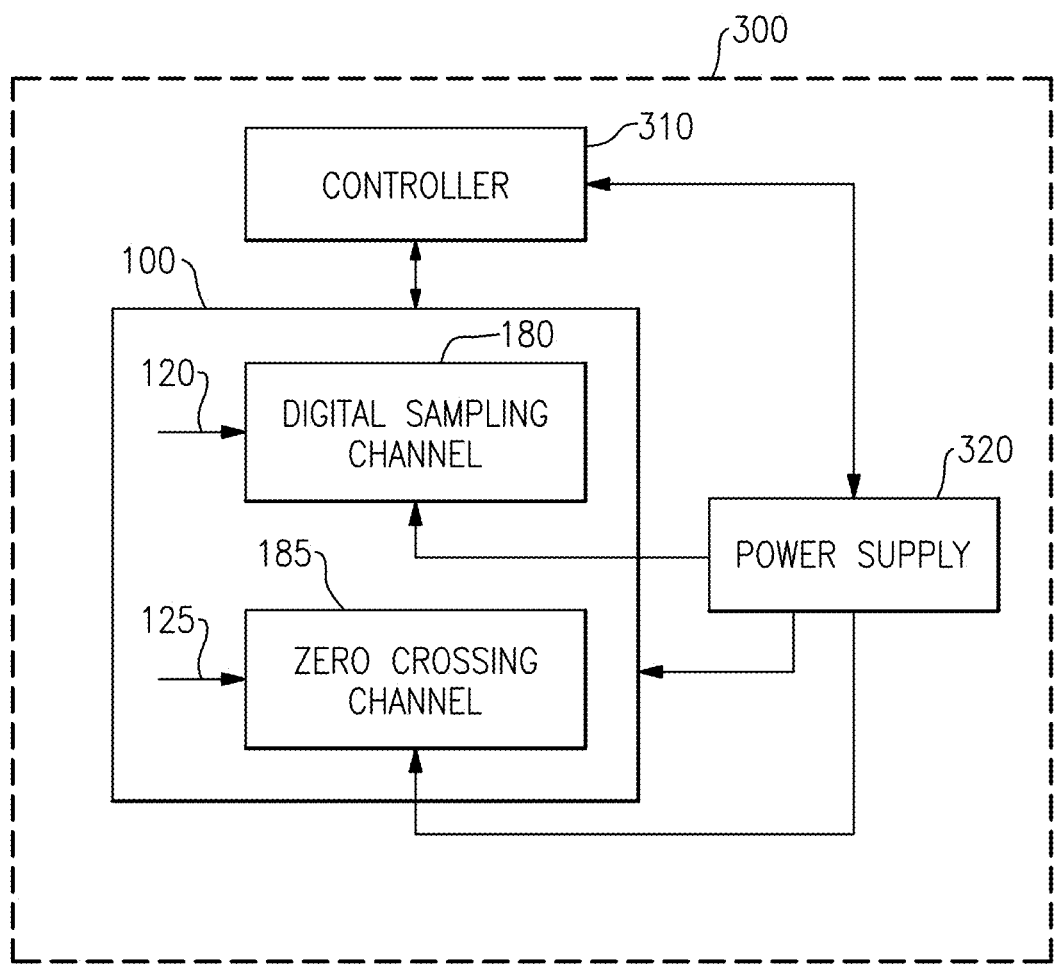
FIG. 3 is a block diagram of another example of an echolocation recording and/or analysis system according to aspects of the invention.

Referring to FIG. 3, according to another embodiment, an echolocation recording and/or analysis system 300 includes a controller 310 that can be configured to selectively operate one or both of a digital sampling analysis channel 180 (including the conditioning channel 130 and analog-to-digital converter discussed above) and a zero crossing analysis channel 185 (including the comparator 145 and associated components discussed above). The controller 310 may include or may be separate from the digital processor 175. In the illustrated example, the system 300 includes a power supply that provides power to components of the system 100 discussed above, including components of the digital sampling analysis channel 180 and zero crossing analysis channel 185. The digital sampling analysis channel may require significantly more power than the zero crossing analysis channel 185 since the full spectrum analysis involves more complex computations and may generate more data. According to one embodiment, the controller 310 may be configured to operate the system 300 in a low-power mode in which only the zero crossing analysis channel 185 is active, whereas the digital sampling analysis channel 180 is powered down. As discussed above, in some embodiments the digital processor 175 is shared by both the digital sampling analysis channel 180 and zero crossing analysis channel 185. Therefore, in these embodiments, the digital processor 175 may remain powered when the digital sampling analysis channel 180 is powered down. When an echolocation call of interest is potentially identified from measurement(s) from the zero crossing analysis channel 185, the controller 310 may activate the digital sampling analysis channel 180 to begin collecting the combined, more complex data set using both channels, as discussed above. This may allow the system 300 to conserve power, particularly in embodiments in which the power supply is a battery, for example, during times when animals (and therefore echolocation calls) of interest are inactive or not present.

In another embodiment, the controller 310 may include a user interface to allow a user of the system 300 to select to operate the system using either or both of the analysis channels 180, 185. Thus, the user can have control over the measurement technique used, which may allow the user greater flexibility in analyzing echolocation calls and identifying the corresponding animals.

As discussed above, in one embodiment, the reference input of the comparator 145 (i.e., reference voltage 150) is set to a threshold level a little above or below the centerline 230 (zero volts). One challenge may lie is selecting an appropriate threshold level, especially for unattended operation of the system 300/100. If set too low, an increase in ambient background noise can exceed the threshold level resulting in potentially large numbers of unwanted zero crossing detections. If set too high, a fainter echolocation call may not be detected. Therefore, in one embodiment, the controller 310 may be configured to periodically sample the background ambient spectrum using the full spectrum analysis channel 180, and based on this background measurement, to set an appropriate reference voltage 150 for the zero crossing detection.

Having described above several aspects of at least one embodiment, it is to be appreciated various alterations, modifications, and improvements will readily occur to those skilled in the art. For example, the above-discussed systems and methods may be applied to ultrasonic echolocation calls from bats, and also to other ultrasonic and non-ultrasonic sound waves traveling in either air or water. Additionally, the same principles may be applied to a range of other signal processing applications. Such alterations, modifications, and improvements are intended to be part of this disclosure and are intended to be within the scope of the invention. Accordingly, the foregoing description and drawings are by way of example only.

What is claimed is:

1. A method for measuring frequency and amplitude of an input signal comprising:
   receiving the input signal at an input of a comparator and at an input of an analog-to-digital converter, the comparator and the analog-to-digital converter being contained within a common housing;
   comparing a voltage of the input signal with a reference voltage using the comparator to produce a first output signal representing zero crossings of the input signal, the first output signal being a square wave;
   dividing the first output signal using a digital divider to aggregate periods of the square wave;
   measuring the aggregated periods of the square wave to determine elapsed time between aggregated consecutive zero crossings of the input signal; and
   digitizing the input signal using the analog-to-digital converter to produce a second output signal representing the amplitude of the input signal.

2. The method of claim 1, further comprising:
   filtering and amplifying the input signal prior to receiving the input signal at the input of the comparator.

3. The method of claim 1, further comprising:
   filtering and amplifying the input signal prior to receiving the input signal at the input of the analog-to-digital converter.

4. The method of claim 1, wherein receiving the input signal includes receiving a signal representative of a sound wave.

5. An echolocation call analysis system comprising:
   an acoustic sensor configured to receive the echolocation call and to produce an input signal representative of the echolocation call;
   a comparator configured to receive the input signal and a reference signal, and to produce a first output signal based on a comparison of the input signal with the reference signal, the first output signal being a square wave and representing zero crossings of the input signal;
   an analog-to-digital converter configured to receive the input signal and to produce a digitized second output signal representing the amplitude of the input signal;
   a digital divider configured to receive the first output signal and to aggregate periods of the square wave; and
   a digital counter coupled to the digital divider and configured to measure the aggregated periods of the square wave to determine elapsed time between aggregated consecutive zero crossings of the input signal.

6. An echolocation call analysis system comprising:
   an acoustic sensor configured to receive an echolocation call and to produce an input signal representative of the echolocation call;
   a comparator configured to receive the input signal and a reference signal, and to produce a first output signal based on a comparison of the input signal with the reference signal, the first output signal representing zero crossings of the input signal;
   an analog-to-digital converter configured to receive the input signal and to produce a digitized second output signal representing the amplitude of the input signal;
   a power supply coupled to the analog-to-digital converter and to the comparator; and
   a controller coupled to the power supply and configured to control the power supply to selectively operate at least one of the comparator and the analog-to-digital converter.

7. The echolocation call analysis system of claim 5, further comprising a housing, and wherein the analog-to-digital converter and the comparator are disposed within the housing.

8. The echolocation call analysis system of claim 6, wherein the first output signal is a square wave and further comprising:
   a digital counter configured to measure periods of the square wave to determine elapsed time between each consecutive zero crossing of the input signal.

9. The echolocation call analysis system of claim 6, wherein the controller is configured to activate the analog-to-digital converter responsive to a determination that the echolocation call corresponds to an animal of interest.

10. The echolocation call analysis system of claim 6, wherein the controller includes a user interface configured to receive a user input; and
- wherein the controller is configured to control the power supply to selectively operate at least one of the comparator and the analog-to-digital converter responsive to the user input.

11. The echolocation call analysis system of claim 6, wherein the controller is configured to activate the analog-to-digital converter to obtain a background measurement from the acoustic sensor, and to adjust the reference signal responsive to the background measurement.

12. The echolocation call analysis system of claim 6, further comprising:
- a digital processor coupled to the comparator and to the analog-to-digital converter and configured to receive the first and second output signals.

13. The echolocation call analysis system of claim 6, further comprising a housing, and wherein the analog-to-digital converter and the comparator are disposed within the housing.

\* \* \* \* \*